Nov. 22, 1966 J. G. BENETTI 3,286,378
WEBBED PRONG-TYPE TOOTH WITH RESILIENT RETAINING MEANS
Filed Dec. 2, 1963

INVENTOR.
JOHN G. BENETTI
BY
*Julian Caplan*
ATTORNEY

United States Patent Office 3,286,378
Patented Nov. 22, 1966

3,286,378
WEBBED PRONG-TYPE TOOTH WITH RESILIENT RETAINING MEANS
John G. Benetti, Cupertino, Calif., assignor, by direct and mesne assignments, of one-half to Gerald A. Petersen, Santa Clara, Calif., and one-half to Anita Petersen, Saratoga, Calif.
Filed Dec. 2, 1963, Ser. No. 327,199
9 Claims. (Cl. 37—142)

This invention relates to a new and improved webbed prong-type tooth for excavating equipment such as earth augers, trenchers and similar machinery, wherein tooth-holders fixed to the equipment are provided with replaceable teeth held therein by resilient means gripped between the webbed portion of the tooth and a portion of the tooth-holder. Reference is made to Petersen Patent No. 2,968,880, showing a type of pronged tooth held in a tooth-holder by a resilient insert extending through a hole in a portion of the tooth-holder fitting between the prongs. The present invention comprises a modification of this general type of tooth and holder.

The teeth of the type shown in Patent No. 2,968,880 have a pair of proximal prongs separated from each other by a slot extending forwardly from the proximal end of the tooth and dividing the end of the tooth into two prongs of substantially rectangular cross-section. These prongs fit into openings in a tooth-holder which openings are defined by parallel top and bottom flange portions and an interconnecting portion complementary to the slot. Space between the top and bottom flange portions is substantially equal to the thickness of the prongs. The present invention differs from such construction primarily in the fact that a web interconnects the prongs so that the slot does not completely separate same. A hole in formed transversely through the web in which fits a resilient insert. The tooth-holder connecting portion is formed with a slot as thick as the tooth web. The insert is wedged between the web and the tooth-holder to hold the tooth in place until it is intentionally dislodged.

An advantage of the present invention is the fact that the location of the resilient insert facilitates the manufacturing of the tooth-holder in that precise location of the hole for the resilient insert is not required.

Another advantage of the invention is that installation of the insert in position is facilitated.

A further feature of the invention is that the web fitting into the slot in the tooth-holder connecting portion improves the stability of the tooth in its holder in a sense that forces applied to the tooth from unusual angles (such as diagonal forces) are resisted and likelihood of unintentional dislodgement of the tooth from its holder is reduced.

Other objects of the present invention will become apparent upon reading the following specification and referring to the accompanying drawings in which similar characters of reference represent corresponding parts in each of the several views.

Figure 1:
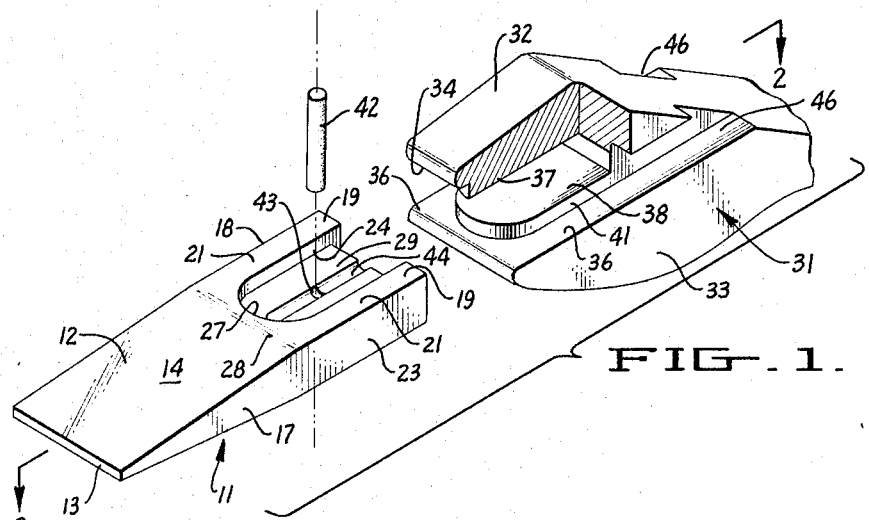
FIG. 1 is an exploded perspective view of the tooth, holder and resilient insert, the holder being partly broken away to reveal internal construction.

The tooth 11 shown in the accompanying drawings has a distal portion 12 which is rectangular in plan, having a blunt transverse forward end 13 and forwardly converging top and bottom faces 14, 16 which terminate at said forward end 13. The side edges 17 of the tooth are preferably vertical, and parallel. The proximal end 18 of the tooth is divided into longitudinally extending prongs 19 each having substantially parallel top and bottom faces 21 and 22 and the vertical side edges 23 are continuations of the side edges 17 of the distal portion 12.

Extending forwardly from the proximal end of tooth 11 and extending into the top and bottom faces thereof are top and bottom slots 24, 26 which terminate in rounded, forward ends 27 slightly to the rear of the juncture 28 where the distal and proximal portions of the tooth meet. In Petersen Patent No. 2,968,880, the slot thereof divides the tooth into discrete prongs. However, a feature of the present invention is the fact that there is a longitudinal, horizontal web 29 joining prongs 19. The thickness of web 29 is materially less than the distance between the top and bottom faces 21, 22, preferably about one-third such thickness. Such tooth 11 is made of hard, tough metal to resist shock so that it need not be sharpened frequently and is preferably replaceable and reversible. However, it is desirable that the tooth be held in a holder 26 in removable fashion so that it may be removed for sharpening, for reversal, or for replacement. Ordinarily, a plurality of teeth 11 are held in a holder 31 fixed to the digging equipment. Such holder 31 may be shaped to receive a single tooth or a plurality of teeth, depending on the design.

The tooth-holder 31 is shaped to receive the proximal end 18 of tooth 11. Thus there are top and bottom flange portions 32, 33 having opposed top and bottom walls 34, 36 which are substantially parallel and are spaced apart about the distance between the top and bottom faces 21, 22 of prongs 19. Centrally of the tooth-holder are top and bottom connecting portions 37, 38 which extend downwardly from the top and bottom portions 32, 33. Said connecting portions are separated from each other by a horizontal slot of a thickness slightly greater than the thickness of web 29 of the tooth. The side edges 41 of portions 37, 38 are spaced apart about the distance between the side edges of the top and bottom slots 24, 26 of the tooth. Accordingly, when tooth 11 is inserted in tooth-holder 31, prongs 19 fit into the openings to either side of the connecting portions 37, 38 and between top and bottom faces 34, 36. Connecting portions 37, 38 of the tooth-holder substantially fill the gaps in tooth 11 left by slots 24, 26 above and below web 29. Web 29 substantially fills the slot in the tooth-holder between connecting portions 37, 38. By reason of the interfitting of the parts as heretofore explained, a stability is imparted securing the tooth in its holder.

Figure 2:
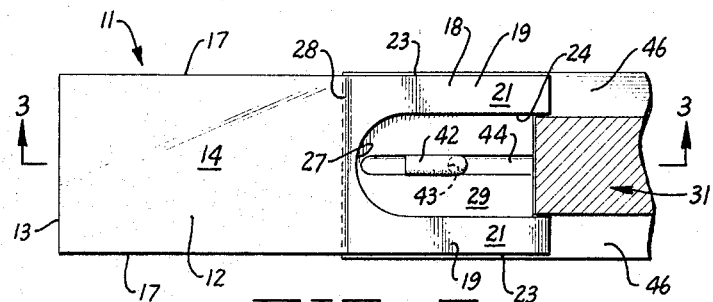
FIG. 2 is a horizontal sectional view taken substantially along the lines 2—2 of FIG. 1.
Figure 4:
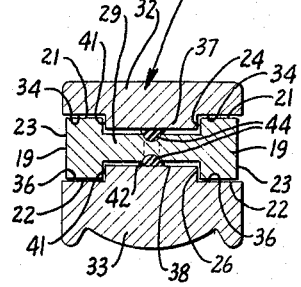
FIG. 4 is a transverse vertical sectional view taken substantially along the lines 4—4 of FIG. 3.
Figure 3:
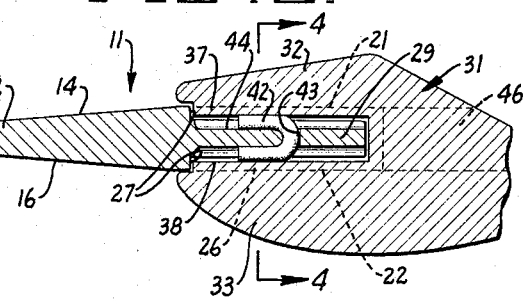
FIG. 3 is a vertical sectional view taken substantially along the lines 3—3 of FIG. 2.

To retain tooth 11 in holder 31, a resilient means 42 is provided. For such purpose, a hole 43 is formed about the center of web 29 and, on top and bottom surfaces of web 29, a longitudinally-extending groove 44 is cut, it being understood that said groove need only be formed for a short distance forward of hole 43 but, as illustrated in the accompanying drawings, for practical purposes groove 44 may extend the whole length of the top and bottom surfaces of the web. Resilient means 42 is preferably a short round piece of resilient material, such as rubber, neoprene, or the like, used as a key to hold the tooth in the holder. Prior to the tooth being inserted in the holder the resilient piece 42 is inserted in hole 42, which it fits fairly tightly. When tooth 11 is inserted in tooth-holder 31 and pushed rearwardly, top and bottom connecting portions 37, 38 engage the opposite ends of the resilient insert 42 and push the same to the position shown in FIG. 2. Since the depth of grooves 44 is less than the thickness of insert 42, the insert is deformed and squeezed between grooves 44 and the top and bottom walls of portions 37, 38 of the tooth-holder. This compresses insert 42 and consequently friction is sufficient to retain the tooth in its holder against accidental displacement. When it is necessary to remove the tooth, provision is made by means of openings 46 in the back of holder 31 which communicate with the space between the top and bottom portions 32, 33, so that a tool may be inserted to drive tooth 11 forwardly with greater force than the frictional force of the resilient insert 42.

Figure 5:
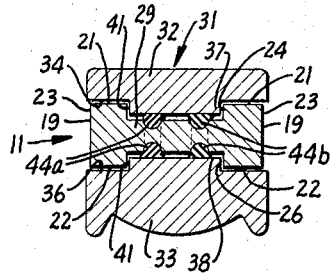
FIG. 5 is a view similar to FIG. 4 of a modification, showing a plurality of inserts.

As shown in FIG. 5, more than one resilient insert 42a, 42b may be used to hold larger teeth in place, there being a hole 43 and set of top and bottom grooves 44a, 44b for such inserts 42a, 42b. Other parts and features are substantially identical and marked with reference numeral corresponding to those of FIGS. 1 to 4.

Although the foregoing invention has been described in some detail, by way of illustration and example for purposes of clarity of understanding, it is understood that certain changes and modifications may be practiced within the spirit of the invention and scope of the appended claims.

What is claimed is:

1. A tooth for digging equipment comprising a distal portion and a proximal portion, said proximal portion divided into a pair of longitudinally extending prongs spaced apart along opposite side edges of said proximal portion and a longitudinally extending web interconnecting said prongs, said web of lesser thickness than said prongs, said web formed with a hole normal to its top and bottom surfaces, and at least one surface of said web formed with a longitudinal groove communicating with said hole and of lesser depth than the diameter of said hole, and a resilient insert positioned in said hole and adapted partially to fit into said groove, said insert being thicker than the depth of said groove.

2. A tooth according to claim 1, in which said prongs have substantially parallel longitudinal top and bottom surfaces and the top and bottom surfaces of said web are substantially parallel to said top and bottom surfaces of said prongs.

3. A tooth according to claim 1, in which said distal portion has forwardly converging top and bottom surfaces terminating in a transverse cutting edge, said distal portion being substantially rectangular in plan with its side edges being substantially continuations of the outer side edges of said prongs.

4. A tooth and holder combination comprising a tooth according to claim 1, and a holder having top and bottom flanges spaced apart slightly greater than the thickness of said prongs and connecting portions extending toward each other from said flanges and separated from each other by a slot of a thickness slightly greater than the thickness of said web, said connecting portion engaging said web and also engaging the inner side edges of said prongs, said resilient insert jammed between the bottom of said groove and one of said connecting portions.

5. A tooth and holder combination comprising a tooth according to claim 1, and a holder having top and bottom flanges spaced apart slightly greater than the thickness of said prongs and connecting portions extending toward each other from said flanges and separated from each other by a slot of a thickness slightly greater than the thickness of said web, said connecting portions engaging said web and also engaging the inner side edges of said prongs, said connecting portion having substantially smooth walls in proximity to said web, said resilient insert jammed between contiguous abutting surfaces of said web and said smooth walls of said connecting portion to restrain unintentional dislodgement of said tooth from said holder.

6. The combination of claim 5, in which one element of the combination of elements comprising said tooth and holder is formed with a hole for said insert and one said element is formed with a longitudinal groove of lesser depth than the thickness of said insert, said groove communicating with said hole.

7. A tooth according to claim 1, in which a second longitudinal groove is formed on the surface of said web opposite said first mentioned grove, said second groove communicating with said hole and being of lesser depth than the diameter of said hole.

8. A tooth for digging equipment comprising a distal portion and a proximal portion, said distal portion having converging top and bottom distal surfaces terminating in a cutting edge, said proximal portion having longitudinally extending top and bottom proximal surfaces and formed with a hole from top to bottom of said proximal portion and longitudinal grooves on said top and bottom proximal surfaces extending forwardly of said hole, and a resilient insert positioned in said hole and adapted partially to fit into said groove, said insert being thicker than the depth of said grooves.

9. A tooth and holder combination comprising a tooth according to claim 8, a holder formed with a recess complementary to said proximal portion, and having substantially smooth walls opposite said grooves adjacent and in close proximity to said top and bottom surfaces of said proximal portion, said resilient insert compressed within said grooves and against said adjacent smooth walls of said recess to restrain unintentional dislodgement of said tooth from said holder.

References Cited by the Examiner

UNITED STATES PATENTS

| | | |
|---|---|---|
| 895,370 | 8/1908 | Hendershot et al. |
| 1,485,434 | 3/1924 | Seal _____ 37—142 |
| 2,674,816 | 4/1954 | Daniels et al. _____ 37—142 |
| 2,968,880 | 1/1961 | Petersen _____ 37—142 |
| 3,057,091 | 10/1962 | Petersen _____ 37—142 |

ABRAHAM G. STONE, *Primary Examiner.*

WILLIAM A. SMITH III, *Examiner.*